US012384148B2

(12) United States Patent
Okushima et al.

(10) Patent No.: US 12,384,148 B2
(45) Date of Patent: Aug. 12, 2025

(54) INKJET PRINTING DEVICE AND INKJET PRINTING METHOD

(71) Applicant: SCREEN HOLDINGS CO., LTD., Kyoto (JP)

(72) Inventors: Tomoyasu Okushima, Kyoto (JP); Takaharu Yamamoto, Kyoto (JP); Ippei Matsumoto, Kyoto (JP); Yuta Ikeda, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 66 days.

(21) Appl. No.: 18/012,150

(22) PCT Filed: Aug. 20, 2021

(86) PCT No.: PCT/JP2021/030579
§ 371 (c)(1),
(2) Date: Dec. 21, 2022

(87) PCT Pub. No.: WO2022/044995
PCT Pub. Date: Mar. 3, 2022

(65) Prior Publication Data

US 2023/0264473 A1 Aug. 24, 2023

(30) Foreign Application Priority Data

Aug. 27, 2020 (JP) ................................. 2020-143649

(51) Int. Cl.
*B41J 2/045* (2006.01)
*B41J 2/21* (2006.01)

(52) U.S. Cl.
CPC ....... *B41J 2/04573* (2013.01); *B41J 2/04586* (2013.01)

(58) Field of Classification Search
CPC .................................................... B41J 2/04573
See application file for complete search history.

(56) References Cited

U.S. PATENT DOCUMENTS

2016/0031209 A1 2/2016 Morizono et al.
2016/0031246 A1* 2/2016 Sreekumar ............. B41J 29/393 347/5

(Continued)

FOREIGN PATENT DOCUMENTS

JP 2012-196787 A 10/2012
JP 2015-047775 A 3/2015

(Continued)

OTHER PUBLICATIONS

International Search Report issued in corresponding International Patent Application No. PCT/JP2021/030579, dated Oct. 19, 2021, with English translation.

*Primary Examiner* — Shelby L Fidler
(74) *Attorney, Agent, or Firm* — Rimon P.C.

(57) ABSTRACT

A technique is provided that reduces the occurrence of a difference in print resolution between an upstream ejector and a downstream ejector due to expansion and contraction of a recording medium. An inkjet printing apparatus includes four heads arranged in a transport direction and four ejection controllers that control the four heads, respectively. Each ejection controller includes an ejection timing generator that generates an ejection timing signal for causing the head that is controlled to eject ink toward a target portion of a recording medium, an expansion/contraction amount estimator that estimates the amount of expansion and contraction in the target portion, and a correction information generator that outputs, to a downstream ejection controller, correction information that includes the ejection timing signal and expansion/contraction amount information indicating the amount of expansion and contraction.

7 Claims, 8 Drawing Sheets

(56) References Cited

U.S. PATENT DOCUMENTS

| | | | |
|---|---|---|---|
| 2019/0092052 A1 | 3/2019 | Yoshida et al. | |
| 2021/0154996 A1* | 5/2021 | Matsuzuki | B41J 2/04573 |
| 2022/0227130 A1* | 7/2022 | Drexler | B41J 11/007 |

FOREIGN PATENT DOCUMENTS

| | | |
|---|---|---|
| JP | 2016-032927 A | 3/2016 |
| JP | 2019-059028 A | 4/2019 |

* cited by examiner

INKJET PRINTING DEVICE AND INKJET PRINTING METHOD

CROSS REFERENCE TO RELATED APPLICATIONS

This application is the U.S. National Phase under 35 U.S.C. § 371 of International Patent Application No. PCT/JP2021/030579, filed on Aug. 20, 2021, which claims the benefits of Japanese Patent Application No. 2020-143649, filed on Aug. 27, 2020 the entire contents of which are hereby incorporated by reference.

TECHNICAL FIELD

The present invention relates to an inkjet printing apparatus and an inkjet printing method.

BACKGROUND ART

Inkjet printing apparatuses that eject ink periodically from nozzles to a recording medium that is being transported in a predetermined transport direction may be used in recording an image on the recording medium. The inkjet printing apparatuses are capable of forming an appropriate image by ejecting ink for each timing when a target position of the recording medium to which the ink is to be ejected has shifted to a predetermined reference ejection position in the transport direction, and by thereby causing the ink to land at appropriate intervals in the transport direction The printing apparatus disclosed in Patent Literature (PTL) 1 eject ink from a plurality of print heads arranged in the transport direction of a recording medium while transporting the recording medium by a roller. Each print head ejects different color ink (black, cyan, magenta, or yellow) in accordance with a detection signal output from an encoder attached to the roller. Thermal expansion of the roller causes a timing difference between detection signals output from different encoders. In that case, the timing of ink ejection from each print head shifts and results in color shifts. Therefore, PTL 1 proposes to reduce the occurrence of color shifts by correcting print data on the basis of the perimeter of the roller.

CITATION LIST

Patent Literature

PTL 1: Japanese Patent Application Laid-Open No. 2016-032927

SUMMARY OF INVENTION

Technical Problem

The recording medium that is being printed on may expand or contract in the transport direction. For example, in the case where the recording medium is paper, the recording medium may expand or contract due to adhesion of the ink to the recording medium or due to drying of the ink adhering to the recording medium. In the case where the recording medium is a film, the recording medium may expand or contract due to the application of heat or tension on the recording medium. The expansion and contraction of the recording medium may cause a difference in print resolution (ink dot pitch) between an upstream ejector and a downstream ejector and accordingly may deteriorate image quality.

It is an object of the present invention to provide a technique for reducing the occurrence of a difference in print resolution between an upstream ejector and a downstream ejector due to the expansion and contraction of a recording medium.

Solution to Problem

To solve the problem described above, a first aspect is an inkjet printing apparatus that includes a transporter that transports a long band-like recording medium in a prescribed transport direction, a first ejector capable of ejecting ink toward the recording medium being transported by the transporter, a first ejection timing generator that generates first ejection timing when the first ejector ejects ink to a target portion of the recording medium, an expansion/contraction amount estimator that estimates an amount of expansion and contraction in the target portion in the transport direction, a second ejector that is capable of ejecting ink toward the recording medium being transported by the transporter, and that is located away from the first ejector on a downstream side in the transport direction, and a second ejection timing generator that generates, in accordance with the amount of expansion and contraction, second ejection timing when the second ejector ejects ink to the target portion.

A second aspect is the inkjet printing apparatus according to the first aspect, in which the expansion/contraction amount estimator estimates the amount of expansion and contraction in accordance an amount of ink that the first ejector ejects to each area obtained by virtually partitioning a surface of the recording medium at a predetermined interval in the transport direction.

A third aspect is the inkjet printing apparatus according to the first aspect further includes encoder that outputs a pulse signal based on an amount of shift of the recording medium caused by the transporter. The second ejection timing generator generates the second ejection timing in accordance with the pulse signal output from the encoder.

A fourth aspect is the inkjet printing apparatus according to any one of the first to third aspects further includes an expansion/contraction amount measuring part that measures the amount of expansion and contraction of the recording medium. The expansion/contraction amount estimator estimates the amount of expansion and contraction in the target portion in accordance with the amount of expansion and contraction of the recording medium measured by the expansion/contraction amount measuring part.

A fifth aspect is an inkjet printing apparatus that includes a transporter that transports a long band-like recording medium in a prescribed transport direction, a first ejector that is capable of ejecting ink toward the recording medium being transported by the transporter, a first ejection timing generator that generates first ejection timing when the first ejector ejects ink to a target portion of the recording medium, a first expansion/contraction amount estimator that estimates, in accordance with the amount of ink ejected to the target portion by the first ejector, a first expansion/contraction amount that is caused in the target portion in the transport direction by the ink ejected from the first ejector, a second ejector that is capable of ejecting ink toward the recording medium being transported by the transporter and that is located away from the first ejector on a downstream side in the transport direction, a second expansion/contraction amount estimator that estimates, in accordance with the amount of ink ejected to the target portion by the first ejector and the amount of ink ejected to the target portion by the second ejector, a second expansion/contraction amount that is caused in the target potion in the transport direction by the ink ejected from the first ejector and the ink ejected from the second ejector, a third ejector that is capable of ejecting ink toward the recording medium being transported by the transporter and that is spaced away from the second ejector on a downstream side in the transport direction, and a third ejection timing generator that generates, in accordance with the second expansion/contraction amount, third ejection timing when the third ejector ejects ink to the target portion.

A sixth aspect is an inkjet printing method that includes (a) transporting a recording medium in a prescribed transport direction, (b) generating first ejection timing when a first ejector ejects ink to a target portion of the recording medium being transported in the operation (a), (c) estimating an amount of expansion and contraction in the target portion in the transport direction, and (d) generating second ejection timing when a second ejector ejects ink toward the target portion, in accordance with the first ejection timing and the amount of expansion and contraction.

Advantageous Effects of Invention

According to the inkjet printing apparatus of the first aspect, the amount of expansion and contraction in the target portion of the recording medium, to which the first ejector has ejected the ink, is used as a basis to determine the ejection timing when the second ejector ejects ink to the target portion. Accordingly, even if expansion and contraction have occurred in the target portion of the recording medium, it is possible to reduce the occurrence of a difference in the print resolution on the target portion between the first ejector and the second ejector.

According to the inkjet printing apparatus of the second aspect, the ejection timing of the second ejector is determined from the amount of shift of the recording medium.

According to the inkjet printing apparatus of the third aspect, the amount of expansion and contraction is estimated from the amount of the ink ejected from the first ejector.

According to the inkjet printing apparatus of the fourth aspect, the second ejection timing is determined based on the measured value of the amount of expansion and contraction of the recording medium.

According to the inkjet printing apparatus of the fifth aspect, in the case where three ejectors (first to third ejectors) are present in the transport direction of the recording medium, the first expansion/contraction amount estimator estimates the first expansion/contraction amount of the target portion in accordance with the amount of the ink ejected from the first ejector, and the second ejection timing generator generates, in accordance with the first expansion/contraction amount, the second ejection timing when the second ejector ejects the ink to the target portion. The second expansion/contraction amount estimator estimates the second expansion/contraction amount of the target portion in accordance with the amount of the ink ejected from the first ejector and the amount of the ink ejected from the second ejector, and the third ejection timing generator generates, in accordance with the second expansion/contraction amount, the third ejection timing when the third ejector ejects the ink to the target portion. Therefore, according to the inkjet printing apparatus of the fifth aspect, even if expansion or contraction has occurred in the target portion of the recording medium, it is possible to reduce the occurrence of a difference in print resolution on the target portion among the first to third ejectors.

According to the inkjet printing method of the sixth aspect, the amount of expansion and contraction in the target portion of the recording medium, to which the first ejector has ejected the ink, is used as a basis to determine the ejection timing when the second ejector ejects the ink to the target portion. Therefore, even if expansion or contraction has occurred in the target portion of the recording medium, it is possible to reduce the occurrence of a difference in print resolution on the target portion between the first ejector and the second ejector.

DESCRIPTION OF EMBODIMENTS

Hereinafter, embodiments of the present disclosure will be described with reference to the accompanying drawings. Note that constituent elements described in each embodiment are merely examples, and the scope of the present invention is not intended to be limited thereto. To facilitate understanding of the drawings, the dimensions or numbers of the constituent elements may be illustrated in exaggerated or simplified form as necessary.

1. First Embodiment

Figure 1:
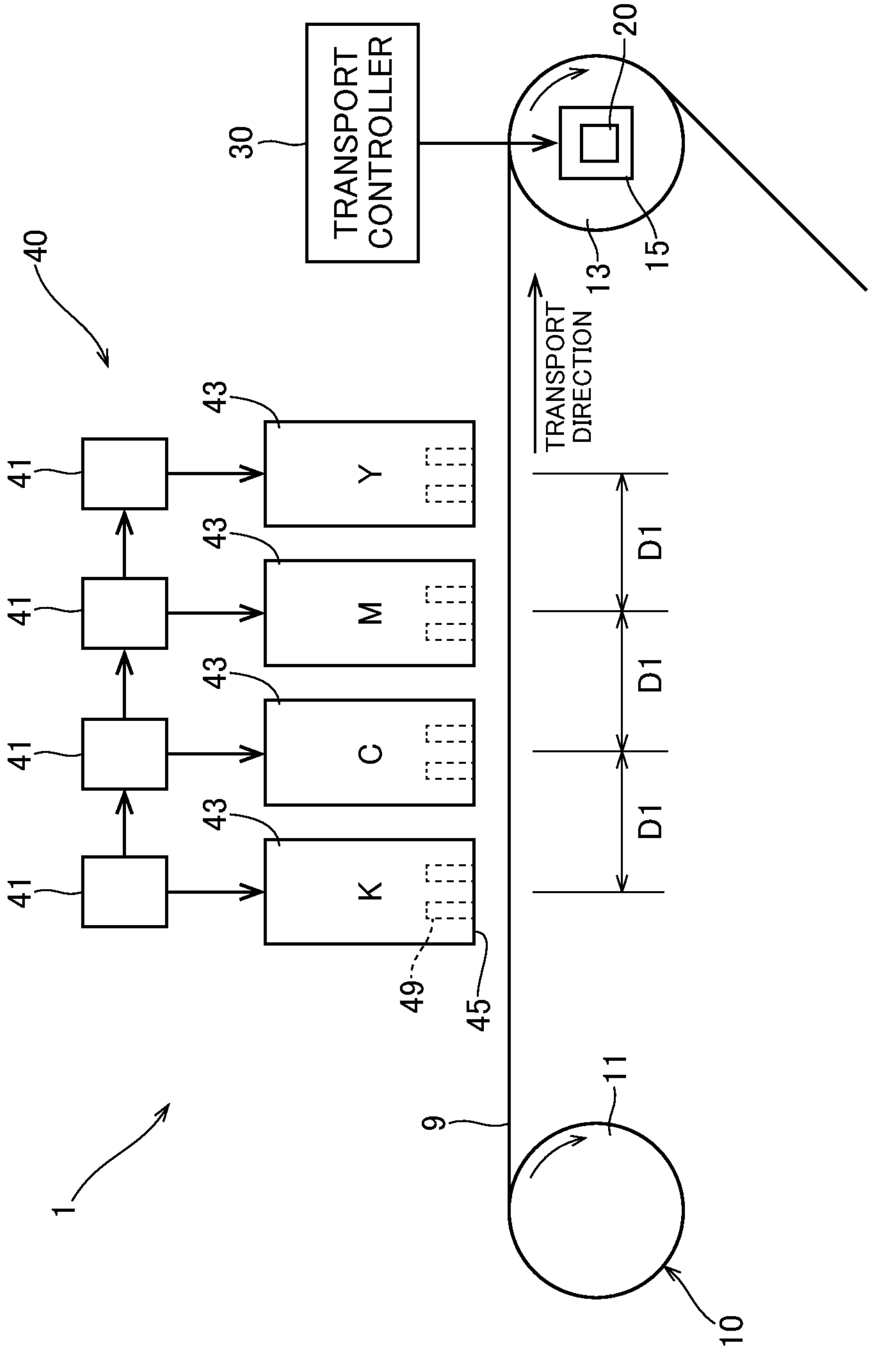
FIG. 1 is an illustration of a configuration of an inkjet printing apparatus according to a first embodiment.

FIG. 1 is an illustration of a configuration of an inkjet printing apparatus 1 according to a first embodiment. The inkjet printing apparatus 1 transports a long band-like recording medium 9 in a prescribed transport direction by, for example, a roll-to-roll method. The inkjet printing apparatus 1 forms an image on the surface of the recording medium 9 by ejecting ink toward the surface of the recording medium 9 that is being transported. The recording medium 9 may be paper or film. As illustrated in FIG. 1, the inkjet printing apparatus 1 includes a transporter 10, a first encoder 20, a transport controller 30, and printer 40.

The transporter 10 includes a first roller 11, a second roller 13, and a transport motor 15. The first roller 11 and the second roller 13 each have an outer peripheral surface that supports the recording medium 9. The recording medium 9 is wound on the outer peripheral surface of the second roller 13. The transport motor 15 is connected to a rotation shaft of the second roller 13. The transport motor 15 rotates the rotation shaft of the second roller 13 so as to move the recording medium 9 from the first roller 11 to the second roller 13 under a predetermined tension.

The first encoder 20 outputs a pulse signal based on the transport speed of the recording medium 9 transported by the transporter 10. The first encoder 20 may be mounted on, for example, the transport motor 15. The first encoder 20 outputs a pulse signal each time the transport motor 15 rotates a predetermined angle. Note that the first encoder 20 may detect the rotation of the second roller 13.

The transport controller 30 controls the transport speed of the recording medium 9 transported by the transporter 10, by controlling the transport motor 15 on the basis of the pulse signal output from the first encoder 20.

The printer 40 includes four ejection controllers 41 and four heads 43. As illustrated in FIG. 1, the heads 43 each have an ejection surface 45 that faces the upper surface (print target surface) of the recording medium 9 transported by the transporter 10. As illustrated in FIG. 1, the ejection surface 45 is approximately parallel to the upper surface of the recording medium 9. The four heads 43 are arranged at regular intervals in the transport direction. That is, the four heads 43 are arranged with a fixed pitch (head-to-head distance D1). However, it is not an absolute necessity to arrange the four heads 43 at regular intervals.

Figure 2:
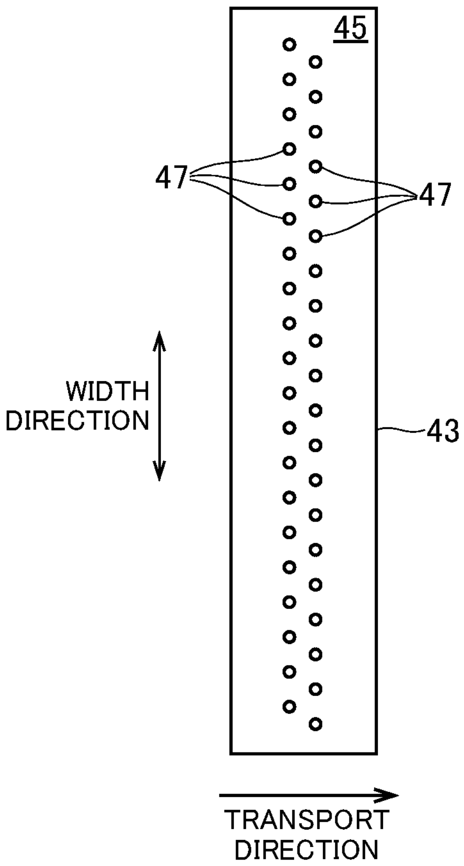
FIG. 2 is an illustration of an ejection surface of a head.

FIG. 2 is an illustration of the ejection surface 45 of one head 43. As illustrated in FIG. 2, the ejection surface 45 has an approximately rectangular shape extending in a width direction orthogonal to the transport direction. The ejection surface 45 has a plurality of nozzles 47 (ejection outlets) from which ink is ejected. The nozzles 47 are arranged at regular intervals in the width direction. The nozzles 47 arranged in the width direction form a plurality of lines (in the present example, two lines) in the transport direction. The nozzles 47 on the first line (on the upstream side in the transport direction) are displaced in the width direction from the nozzles 47 on the second line (on the downstream side in the transport direction).

The heads 43 form an image corresponding to image data on the upper surface of the recording medium 9 by ejecting ink from each nozzle 47 toward the recording medium 9 transported by the transporter 10. The heads 43 each include a plurality of inkjet elements 49 (see FIG. 1) that each correspond respectively to each nozzle 47. The inkjet elements 49 jet ink from the nozzles 47. For example, the inkjet elements 49 each may be configured of an ink room in which ink is stored, and a piezoelectric element that configures the wall surface of the ink room. When voltage is applied, the piezoelectric element applies pressure to the ink stored in the ink room. When pressure is applied to the ink, the ink is ejected from the nozzle 47 that communicates with the ink room. The nozzle 47 and the inkjet element 49 are one example of an ejector.

As illustrated in FIG. 1, the four heads 43 are arranged at intervals in the transport direction. For example, each of the four heads 43 may eject ink corresponding to one of four colors including black (K), cyan (C), magenta (M), and yellow (Y). Note that the colors ejected from the heads 43 are not limited to K, C, M, and Y. The number of heads 43 is also not limited to four, and may be in the range of one to three, or five or more.

The ejection controllers 41 each control the ejection of ink from each nozzle 47 of the corresponding head 43. In the following description, when a specific head 43 is focused on, the head 43 that is located adjacent to the upstream side of the specific head 43 may be simply referred to as the "upstream head 43," and the head 43 that is located adjacent to the downstream side of the specific head 43 may be simply referred to as the "downstream head 43." Moreover, the ejection controller 41 corresponding to the upstream head 43 may be simply referred to as the "upstream ejection controller 41," and the ejection controller 41 corresponding to the downstream head 43 may be simply referred to as the "downstream ejection controller 41."

Figure 3:
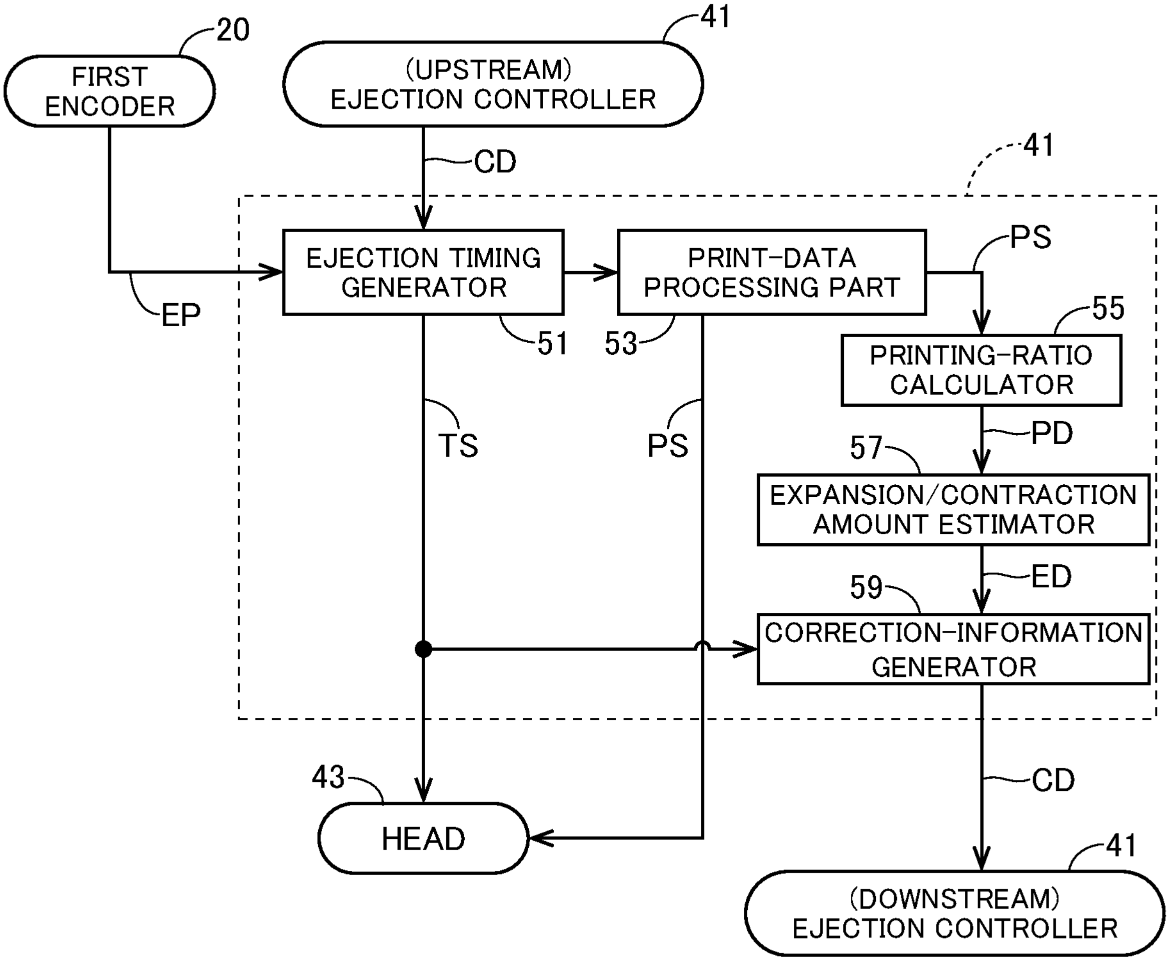
FIG. 3 is an illustration of a configuration of an ejection controller.

FIG. 3 is an illustration of the configuration of one ejection controller 41. The ejection controller 41 includes an ejection timing generator 51, a print-data processing part 53, a printing-ratio calculator 55, an expansion/contraction amount estimator 57, and a correction information generator 59. The ejection controller 41 may be configured as a dedicated circuit such as an application specific integrated circuit (ASIC). Alternatively, the ejection controller 41 may be configured as a general-purpose computer that includes, for example, a processor such as a CPU and a RAM electrically connected to the processor. Each function of the ejection controller 41 may be realized by the processor operating in accordance with a program.

The ejection timing generator 51 generates an ejection timing signal TS on the basis of a pulse signal EP output from the first encoder 20. The ejection timing generators 51 of the second to fourth ejection controllers 41 from the upstream side each acquire correction information CD that is output from the correction information generator 59 of the upstream ejection controller 41. These ejection timing generators 51 generate the ejection timing signal TS on the basis of the pulse signal EP and the acquired correction information CD. The ejection timing generator 51 of the ejection controller 41 that corresponds to the first head 43 from the upstream side generates the ejection timing signal TS on the basis of only the pulse signal EP.

Each ejection timing generator 51 outputs the generated ejection timing signal TS to the head 43, the print-data processing part 53, and the correction information generator 59. The ejection timing signal TS serves as a trigger for the inkjet elements 49 of the head 43 to eject ink from the nozzles 47. The processing in which the ejection timing generator 51 generates the ejection timing signal TS corresponds to processing for generating the timing when the ejector ejects ink.

Upon acquisition of the ejection timing signal TS, the print-data processing part 53 outputs a print data signal PS based on the print data. The print data is data for forming characters or images on the recording medium 9. The print-data processing part 53 outputs the generated print data signal PS to the head 43 and the printing-ratio calculator 55. The print data signal PS is a control signal for selectively ejecting ink from each nozzle 47 with the timing indicated by the ejection timing signal TS. The head 43 selectively ejects ink from each nozzle 47 on the basis of the ejection timing signal TS and the print data signal PS.

The printing-ratio calculator 55 calculates a printing ratio on the basis of the print data signal PS. The printing ratio refers to information that indicates the amount of ink to be ejected to each target area, the target area being obtained by virtually dividing the surface of the recording medium 9 at fixed intervals in the transport direction into a plurality of areas. The printing-ratio calculator 55 outputs printing-ratio information PD that indicates the calculated printing ratio, to the expansion/contraction amount estimator 57.

The expansion/contraction amount estimator 57 estimates, on the basis of the printing-ratio information PD, the magnitude of expansion or contraction (the amount of expansion or contraction) in the transport direction that may occur in a target portion to which the head 43 to be controlled has ejected ink. The expansion/contraction amount estimator 57 outputs expansion/contraction amount information ED that indicates the estimated amount of expansion and contraction of the recording medium 9, to the correction information generator 59. The expansion/contraction amount estimator 57 may estimate the amount of expansion and contraction, using an expansion/contraction amount table that prescribes the relationship between the printing ratio and the amount of expansion and contraction. The ejection controller 41 may further include a storage that stores the expansion/contraction amount table. The expansion/contraction amount table may be prepared for each ink color. For example, in the case where the amount of expansion and contraction of the recording medium 9 varies depending on the ink color, it is preferable that the expansion/contraction amount table may be prepared for each color.

In the case where the printing ratio is the same but the amount of expansion and contraction of the recording medium 9 varies depending on a transport speed range of the recording medium 9, it is preferable that a different expansion/contraction amount table may be prepared for each transport speed range. This allows accurate printing during adjustable speed printing.

Similarly, in the case where the printing ratio is the same but the amount of expansion and contraction of the recording medium 9 varies depending on the magnitude of the tension applied to the recording medium 9, it is preferable that a different expansion/contraction amount table may be prepared for each tension range. This allows accurate printing even in the case where the tension applied to the recording medium 9 varies during printing (e.g., the transport speed is increased or reduced).

The correction information generator 59 generates correction information CD on the basis of the expansion/contraction amount information ED and the ejection timing signal TS. The correction information generator 59 outputs the generated correction information CD to the downstream ejection controller 41. The correction information CD refers to information for allowing the downstream ejection controller 41 to correct the ejection timing. The correction information CD includes the ejection timing signal TS and the expansion/contraction amount information ED corresponding to the ejection timing signal TS. The ejection timing indicated by the ejection timing signal TS is information that indicates the position of the target portion of the recording medium 9 to which the head 43 has ejected ink.

Note that the ejection controller 41 of the head 43 that is located on the most downstream side may not include the printing-ratio calculator 55, the expansion/contraction amount estimator 57, and the correction information generator 59.

Figure 4:
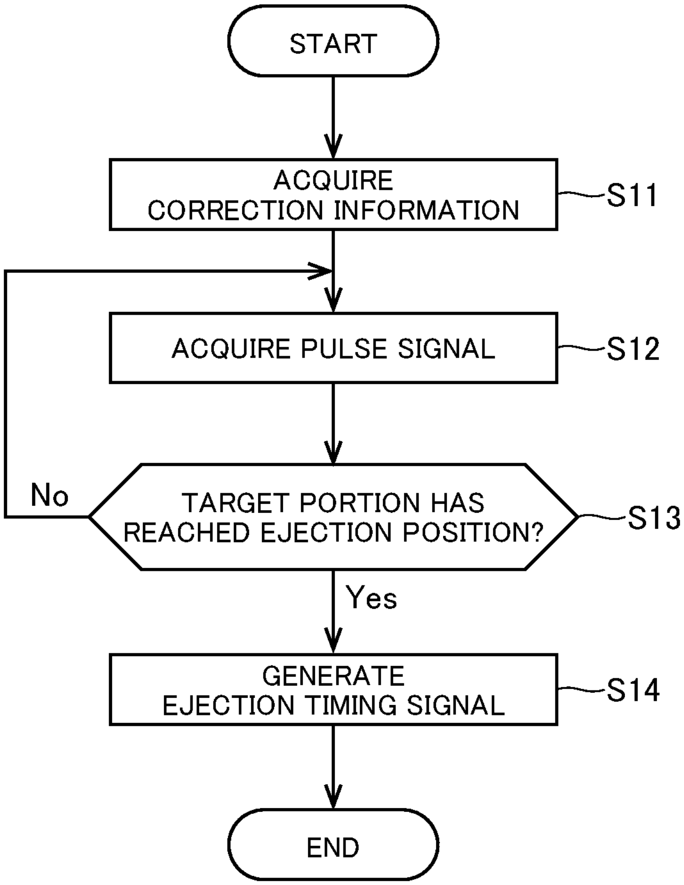
FIG. 4 is a flowchart of processing in which the ejection controller generates an ejection timing signal.

FIG. 4 is a flowchart of the processing in which one ejection controller 41 generates the ejection timing signal TS. As illustrated in FIG. 4, the ejection timing generator 51 of the ejection controller 41 acquires the correction information CD generated by the correction information generator 59 of the upstream ejection controller 41 (correction-information acquisition processing S11). Upon acquisition of the correction information CD, the ejection timing generator 51 acquires the pulse signal EP from the first encoder 20 (pulse-signal acquisition processing S12). The ejection timing generator 51 determines, on the basis of the correction information CD and the pulse signal EP, whether the target portion of the recording medium 9 to which the upstream head 43 has ejected ink has reached a position (ejection position) at which ink is to be ejected from the head 43 to be controlled (determination processing S13). Specifically, in the determination processing S13, the ejection timing generator 51 determines whether a moving distance of the recording medium 9 from the timing indicated by the ejection timing signal TS included in the correction information CD output from the upstream ejection controller 41 (i.e., the ejection timing when the upstream head 43 has ejected ink to the target portion) has exceeded a corrected distance that is obtained by correcting the head-to-head distance D1, using the amount of expansion and contraction.

If it is determined in the determination processing S13 that the target position has not reached the ejection position (i.e., moving distance<corrected distance) (in the case of No), the ejection timing generator 51 executes the pulse-signal acquisition processing S12 again. If it is determined in the determination processing S13 that the target position has reached the ejection position (i.e., moving distance≥corrected distance) (in the case of Yes), the ejection timing generator 51 generates the ejection timing signal TS (ejection-timing generation processing S14).

Figure 5:
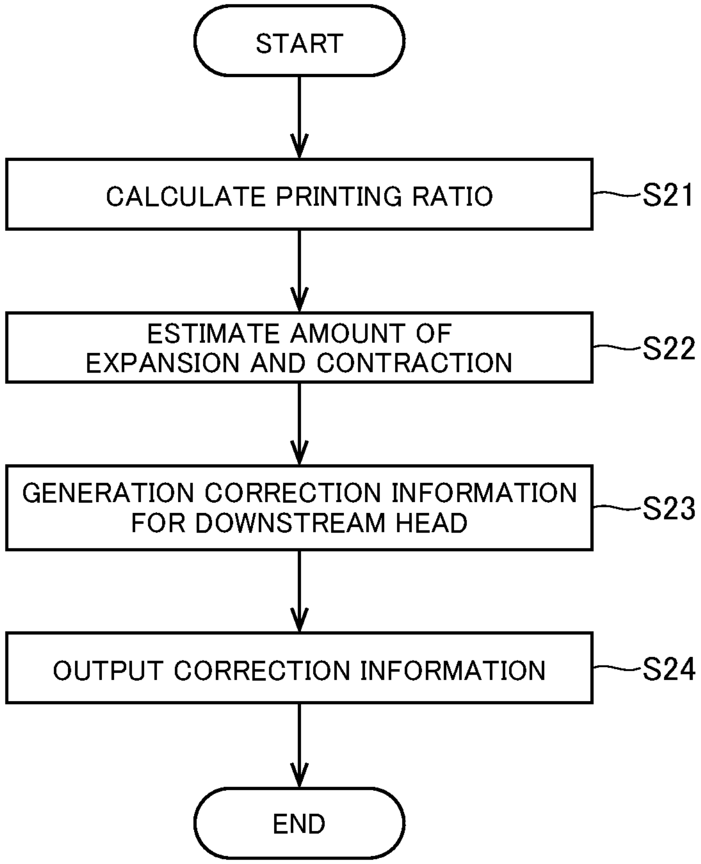
FIG. 5 is a flowchart of processing in which the ejection controller generates correction information.

FIG. 5 is a flowchart of processing in which one ejection controller 41 generates the correction information CD. As illustrated in FIG. 5, the printing-ratio calculator 55 of the ejection controller 41 calculates, on the basis of the print data signal PS, the printing ratio of the target portion of the recording medium 9 that corresponds to the ejection timing (printing-ratio calculation processing S21). The expansion/contraction amount estimator 57 estimates, on the basis of the printing-ratio information PD indicating the printing ratio calculated by the printing-ratio calculation processing S21, the amount of expansion and contraction that may occur in the target portion of the recording medium 9 (expansion/contraction-amount estimation processing S22). The target portion of the recording medium 9 refers to a portion of the recording medium 9 to which ink is to be ejected from the head 43 with the ejection timing generated by the ejection-timing generation processing S14. The correction information generator 59 generates the correction information CD that includes the expansion/contraction amount estimated by the expansion/contraction-amount estimation processing S22 and the ejection timing signal TS generated by the ejection-timing generation processing S14 (correction-information generation processing S23). The correction information generator 59 outputs the generated correction information CD to the downstream ejection controller 41 (correction-information output processing S24).

Figure 6:
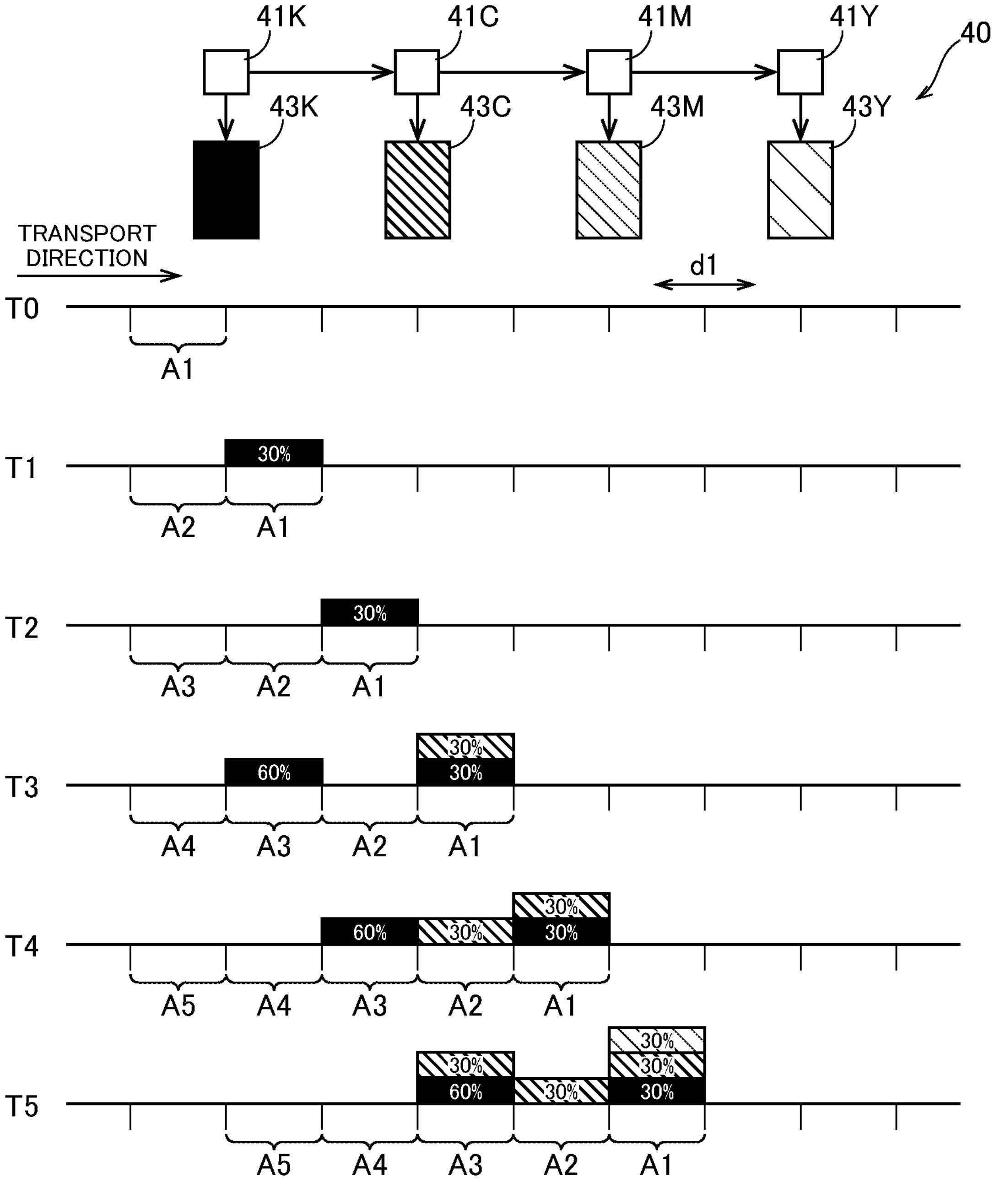
FIG. 6 is a diagram showing a condition in which the inkjet printing apparatus executes print processing.

FIG. 6 is a diagram showing a condition in which the inkjet printing apparatus 1 executes print processing. In the following description, the four heads 43 are respectively referred to as a first head 43K, a second head 43C, a third head 43M, and a fourth head 43Y in order from the upstream side in the transport direction. The four ejection controllers 41 are also respectively referred to as a first ejection controller 41K, a second ejection controller 41C, a third ejection controller 41M, and a fourth ejection controller 41Y in order from the upstream side. In the example illustrated in FIG. 6, it is assumed that the recording medium 9 is virtually partitioned into a plurality of areas A1 to A5 in the transport direction and the ratio of expansion and contraction in each of the areas A1 to A5 is estimated based on the average value of the printing ratios of the areas A1 to A5.

First, a description is given of print control of the first to fourth heads 43K to 43Y for the area A1. The first head 43K ejects the K ink to the area A1 at an average printing ratio of 30% during a period T0-T1 from time T0 when the downstream end of the area A1 in the transport direction reaches immediately under the first head 43K to time T1 when the upstream end of the area A1 in the transport direction reaches immediately under the first head 43K. The first ejection controller 41K outputs, to the second ejection controller 41C, the amount of expansion and contraction in the area A1 that corresponds to the average K-ink printing ratio of 30%.

The downstream end of the area A1 in the transport direction reaches immediately under the second head 43C at time T2. This time T2 is adjusted for the amount of expansion and contraction caused in the area A1 by the K ink ejected from the first head 43K. The second head 43C ejects the C ink to the area A1 at an average printing ratio of 30% during a period from time T2 to time T3 when the upstream end of the area A1 in the transport direction reaches immediately under the second head 43C. At this time, the second ejection controller 41C generates ejection timing that is adjusted by a time quantity depending on the amount of expansion and contraction in the area A1 (the amount of expansion and contraction in the area A1 that corresponds to the average K-ink printing ratio of 30%) output from the first ejection controller 41K. Accordingly, the print resolution (ink dot pitch) offered for the area A1 by the second head 43C matches with the print resolution offered for the area A1 by the first head 43K. The second ejection controller 41C outputs, to the third ejection controller 41M, the amount of expansion and contraction in the area A1 that corresponds to the average K-ink printing ratio of 30% and the average C-ink printing ratio of 30%.

The downstream end of the area A1 in the transport direction reaches immediately under the third head 43M at time T4. This time T4 is adjusted for the amount of expansion and contraction caused in the area A1 by the K ink ejected from the first head 43K and the C ink ejected from the second head 43C. The third head 43M ejects the M ink to the area A1 at an average printing ratio of 30% during a period from time T4 to the time when the upstream end of the area A1 in the transport direction reaches immediately under the third head 43M. At this time, the third ejection controller 41M generates ejection timing that is adjusted by a time quantity depending on the amount of expansion and contraction in the area A1 output from the second ejection controller 41C (the amount of expansion and contraction in the area A1 that corresponds to the average K-ink printing ratio of 30% and the average C-ink printing ratio of 30%). Accordingly, the print resolution offered for the area A1 by the third head 43M matches with the print resolution offered for the area A1 by the first head 43K and the print resolution offered for the area A1 by the second head 43C. The third ejection controller 41M outputs, to the fourth ejection controller 41Y, the amount of expansion and contraction in the area A1 that corresponds to the average K-ink printing ratio of 30%, the average C-ink printing ratio of 30%, and the average M-ink printing ratio of 30%.

The fourth ejection controller 41Y generates ejection timing that is adjusted by a time quantity depending on the amount of expansion and contraction in the area A1 output from the third ejection controller 41M (the average K-ink printing ratio of 30%, the average C-ink printing ratio of 30%, and the average M-ink printing ratio of 30%). Accordingly, the print resolution offered for the area A1 by the fourth head 43Y matches with the print resolution offered for the area A1 by the first head 43K, the print resolution offered for the area A1 by the second head 43C, and the print resolution offered for the area A1 by the third head 43M.

As described above, the heads 43K, 43C, 43M, and 43Y sequentially perform recording on the area A1, and each head 43 is capable of ejecting ink with the ejection timing that reflects the amount of expansion and contraction in the area A1, the amount of expansion and contraction reflecting the average printing ratios of all the heads 43 that are located upstream of the head 43 concerned. Accordingly, it is possible to reduce the occurrence of a difference in print resolution among the ink images recorded on the area A1.

Next, the area A2 that is the continuous area following the area A1 is focused on. The first head 43K does not eject ink to the area A2. Thus, the first ejection controller 41K outputs, to the second ejection controller 41C, the ratio of expansion and contraction in the area A2 that corresponds to an average K-ink printing ratio of 0% (i.e., the ratio of expansion and contraction of 0%).

Therefore, the second head 43C ejects the C ink to the area A2 at an average printing ratio of 30% without correcting the ejection timing during the period from time T3 to time T4. The second ejection controller 41C outputs, to the third ejection controller 41M, the ratio of expansion and contraction in the area A2 that corresponds to the average C-ink printing ratio of 30%. Descriptions of the areas A3 to A5 shall be omitted.

As described above, the ejection controller 41 generates the ejection timing for the target portion on the basis of the amount of expansion and contraction occurring in the target portion (areas A1 to A5) to which the upstream head 43 has ejected ink. This reduces the occurrence of a difference in print resolution for the target portion among the different heads 43.

2. Second Embodiment

Figure 7:
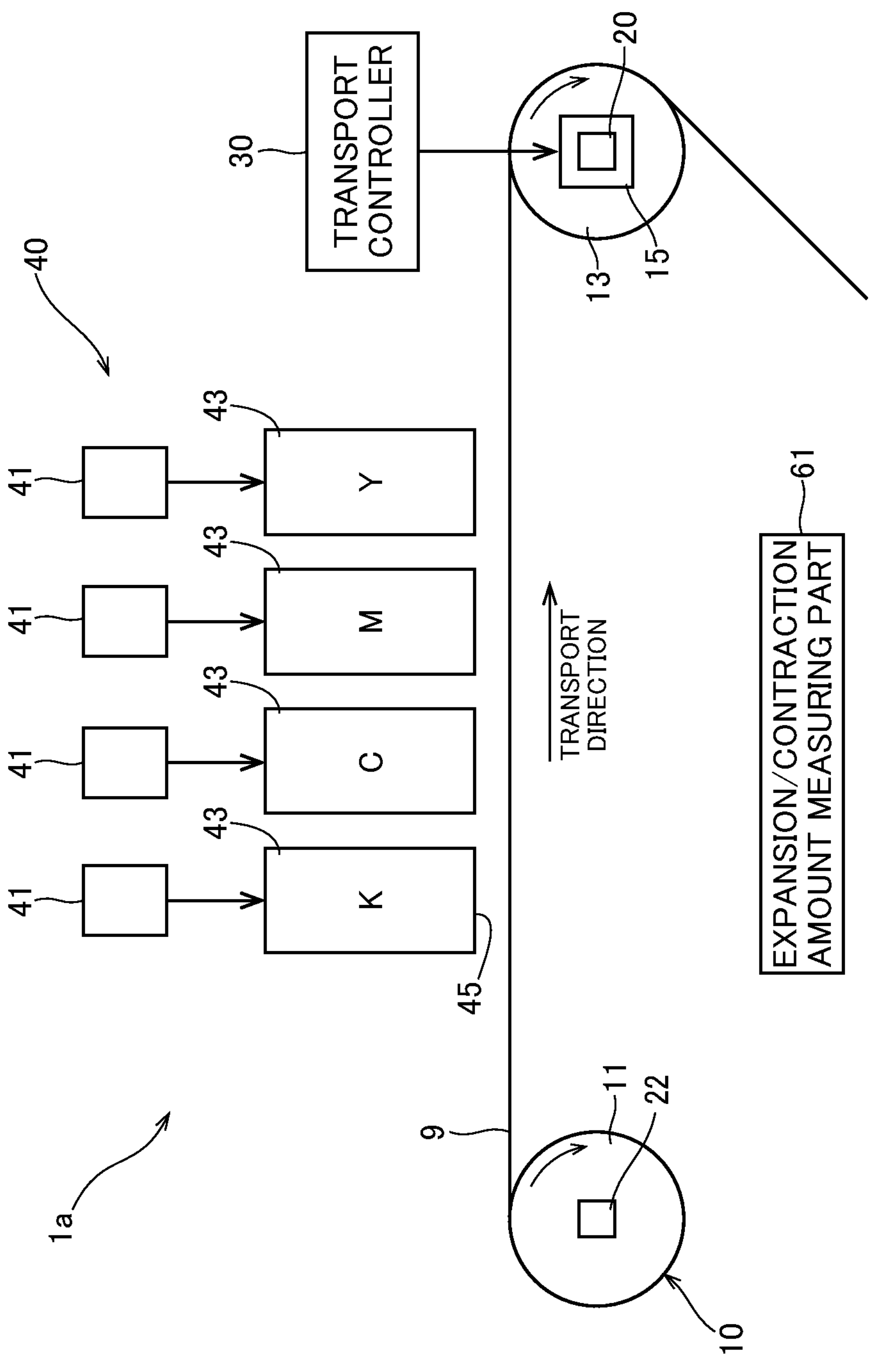
FIG. 7 is an illustration of a configuration of an inkjet printing apparatus according to a second embodiment.

FIG. 7 is an illustration of a configuration of an inkjet printing apparatus 1*a* according to a second embodiment. The inkjet printing apparatus 1*a* includes a second encoder 22 and an expansion/contraction amount measuring part 61. The second encoder 22 is mounted on the first roller 11 to detect the rotation of the first roller 11. Specifically, the second encoder outputs a pulse signal each time the first roller 11 rotates a predetermined angle.

The expansion/contraction amount measuring part 61 measures a total amount of expansion and contraction of the recording medium 9 between the first roller 11 and the second roller 13, on the basis of a shift between the pulse signal output from the first encoder 20 and the pulse signal output from the second encoder 22.

The expansion/contraction amount estimator 57 of each ejection controller 41 estimates, on the basis of the total amount of expansion and contraction, the amount of expansion and contraction of the recording medium 9 at the position of the head 43 to be controlled. At this time, the total amount of expansion and contraction may be allocated according to the position of each head 43. In the case where the amount of expansion and contraction of the recording medium 9 increases with increasing amount of ink ejection, the amount of expansion and contraction at the position of each head 43 may be set to increase gradually toward the downstream side.

According to the inkjet printing apparatus 1*a*, the total amount of expansion and contraction of the recording medium 9 can be actually measured by the expansion/contraction amount measuring part 61. This allows each ejection controller 41 to effectively estimate the amount of expansion and contraction at each position, and accordingly it is possible to generate the ejection timing that depends on the expansion and contraction of the recording medium 9.

3. Third Embodiment

Figure 8:
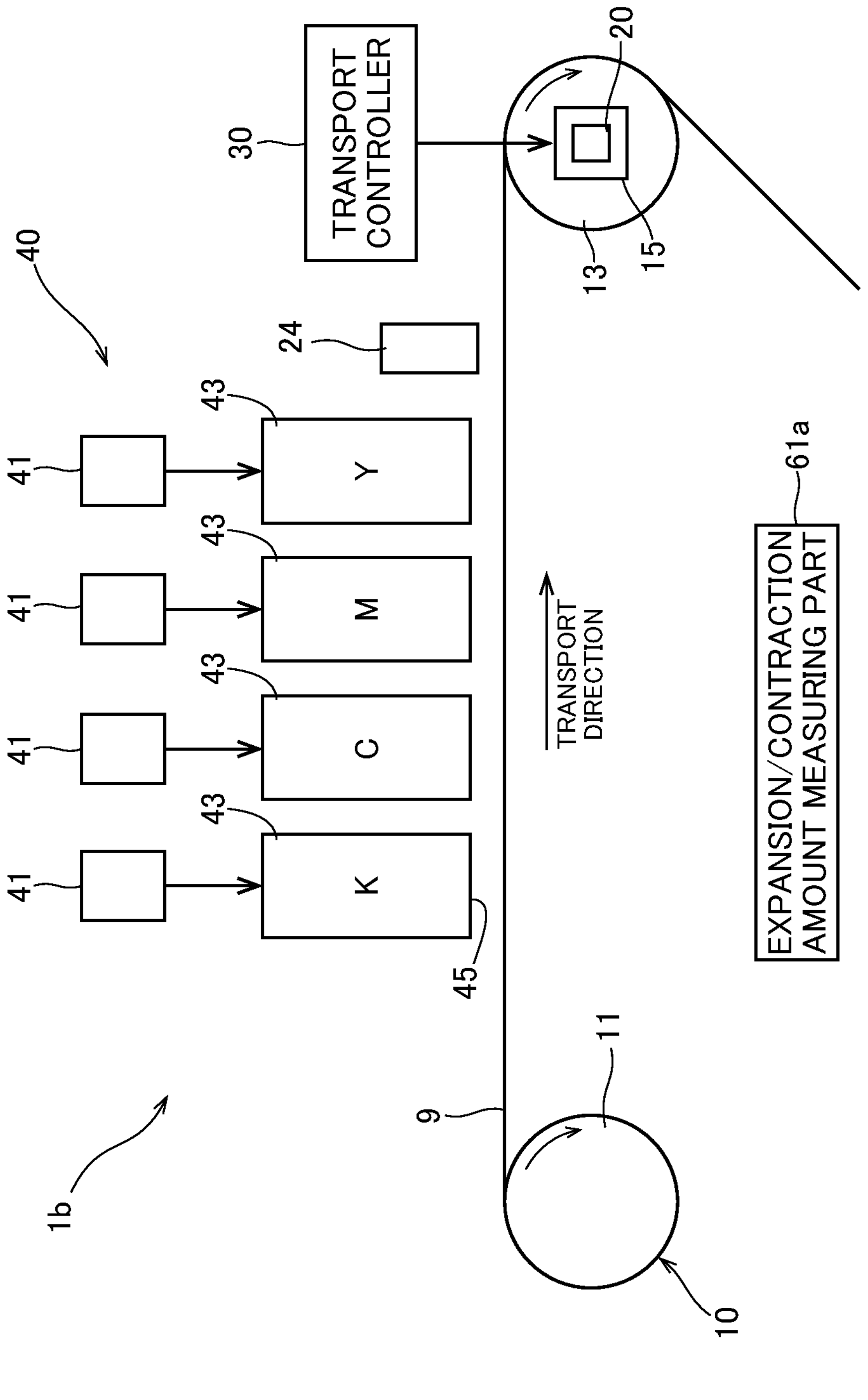
FIG. 8 is an illustration of a configuration of an inkjet printing apparatus according to a third embodiment.

FIG. 8 is an illustration of a configuration of an inkjet printing apparatus 1*b* according to a third embodiment. The inkjet printing apparatus 1*b* includes a mark sensor 24 and an expansion/contraction amount measuring part 61*a*. For example, the mark sensor 24 may be configured as a camera. The mark sensor 24 detects marks that are formed on the surface of the recording medium 9 at predetermined intervals. The marks may be originally formed on the recording medium 9, or may be formed by ink ejected from one head 43. The expansion/contraction amount measuring part 61*a* measures a total amount of expansion and contraction of the recording medium 9 on the basis of timing when the mark sensor 24 detects the marks. The expansion/contraction amount estimator 57 of each ejection controller 41 estimates the amount of expansion and contraction at the position of each head 43 on the basis of the total amount of expansion and contraction measured by the expansion/contraction amount measuring part 61*a*.

According to the inkjet printing apparatus 1*b*, the total amount of expansion and contraction of the recording medium 9 can be measured by the expansion/contraction amount measuring part 61*a*. This allows each ejection controller 41 to effectively estimate the amount of expansion and contraction of the recording medium 9, and accordingly it is possible to generate ejection timing that depends on the expansion and contraction of the recording medium 9.

4. Variations

While the embodiments have been described thus far, the present invention is not intended to be limited to the embodiments described above, and may be modified in various ways.

For example, the expansion/contraction amount estimator 57 may estimate the amount of expansion and contraction in the target portion of the recording medium 9 on the basis of the temperature of the recording medium 9 or the temperature around the recording medium 9. In this case, the inkjet printing apparatuses 1, 1*a*, and 1*b* may further include a thermometer (not shown) that measures the temperature of the recording medium 9 or the temperature around the recording medium 9. The expansion/contraction amount estimator 57 may also use the transport speed of the recording medium 9 as a basis to estimate the amount of expansion and contraction of the target portion of the recording medium 9.

Each ejection controller 41 estimates the amount of expansion and contraction in the target portion to which the head 43 to be controlled has ejected ink, and outputs the estimated amount of expansion and contraction to the downstream ejection controller 41. However, the downstream ejection controller 41 may estimate the amount of expansion and contraction in the target portion. That is, the ejection controller 41 may estimate the amount of expansion and contraction in the target portion of the recording medium 9 to which the upstream head 43 has ejected ink.

In the embodiments described above, each ejection controller 41 generates the ejection timing of the head 43 in accordance with the amount of expansion and contraction of the recording medium 9 and thereby reduces the occurrence of a difference in print resolution between the head 43 to be controlled and the upstream head 43. Alternatively, it is also possible to reduce the occurrence of a difference in print resolution among the nozzles 47 located at different positions in the transport direction within one head 43. That is, the ejection timing (first ejection timing) when the upstream nozzle 47 (first ejector) ejects ink to the target portion and the amount of expansion and contraction in the target portion may be used as a basis to generate the ejection timing (second ejection timing) for the downstream nozzle 47 (second ejector).

While the invention has been shown and described in detail, the foregoing description is in all aspects illustrative and not restrictive. It is therefore understood that numerous modifications and variations that are not described above can be devised without departing from the scope of the invention. The configurations in the embodiment and variations described above may be appropriately combined or omitted as long as there are no mutual inconsistencies.

REFERENCE SIGNS LIST

1, 1*a*, 1*b* inkjet printing apparatus
10 transporter
20 first encoder
30 transport controller
41 ejection controller
43 head
47 nozzle
51 ejection timing generator
55 printing-ratio calculator
57 expansion/contraction amount estimator
61, 61*a* expansion/contraction amount measuring part
9 recording medium

The invention claimed is:

1. An inkjet printing apparatus comprising:
- a transporter configured to transport a long band-like recording medium in a prescribed transport direction;
- an encoder configured to output a pulse signal based on an amount of shift of the recording medium caused by the transporter;
- a first head configured to eject ink toward the recording medium being transported by the transporter;
- a second head positioned most downstream in the transport direction and configured to eject ink toward the recording medium being transported by the transporter, wherein the second head is positioned downstream in the transport direction of the first head and separated from the first head by a head-to-head distance;
- a first ejection controller configured to control ink ejection from the first head; and
- a second ejection controller configured to control ink ejection from the second head, wherein the first ejection controller includes:
- a first ejection timing signal generator configured to generate a first ejection timing signal based on the pulse signal and output the first ejection timing signal to the first head;
- a printing-ratio calculator configured to calculate printing-ratio information based on print data for forming characters or images on the recording medium;
- an expansion/contraction amount estimator configured to estimate an amount of expansion and contraction of a target portion in the transport direction based on the printing-ratio information; and
- a correction information generator configured to generate correction information including the amount of expansion and contraction based on the amount of expansion and contraction and the first ejection timing signal, and wherein the second ejection controller includes a second ejection timing signal generator configured to:
- acquire the pulse signal and the correction information;
- determine whether a moving distance of the recording medium from an ejection timing of the first head for the target portion has exceeded a corrected distance that is obtained by correcting the head-to-head distance using the amount of expansion and contraction, based on the pulse signal and the amount of expansion and contraction included in the correction information; and when determining that the moving distance has exceeded the corrected distance, generate a second ejection timing signal by adjusting the pulse signal by a time quantity corresponding to the amount of expansion and contraction in the target portion, and output the second ejection timing signal to the second head.

2. The inkjet printing apparatus according to claim 1, wherein the expansion/contraction amount estimator estimates the amount of expansion and contraction in accordance with an amount of ink that the first head ejects to each area obtained by virtually partitioning a surface of the recording medium at a predetermined interval in the transport direction.

3. The inkjet printing apparatus according to claim 1, further comprising:

an expansion/contraction amount measuring part that measures the amount of expansion and contraction of the recording medium, wherein the expansion/contraction amount estimator estimates the amount of expansion and contraction in the target portion in accordance with the amount of expansion and contraction of the recording medium measured by the expansion/contraction amount measuring part.

4. The inkjet printing apparatus according to claim 1, further comprising a storage that stores an expansion/contraction amount table that prescribes a relationship between a printing ratio and an amount of expansion and contraction, wherein the expansion/contraction amount table is prepared for each ink color, and wherein the expansion/contraction amount estimator of the first ejection controller is further configured to estimate the amount of expansion and contraction using the expansion/contraction amount table.

5. The inkjet printing apparatus according to claim 1, further comprising a storage that stores expansion/contraction amount tables that prescribe a relationship between a printing ratio and an amount of expansion and contraction, wherein a different expansion/contraction amount table is stored for each transport speed, wherein the expansion/contraction amount estimator is further configured to estimate the amount of expansion and contraction using the expansion/contraction amount tables.

6. The inkjet printing apparatus according to claim 1, further comprising a storage that stores an expansion/contraction amount table that prescribes a relationship between a printing ratio and an amount of expansion and contraction, wherein different expansion/contraction amount tables are stored for each tension range, and wherein the expansion/contraction amount estimator is further configured to estimate the amount of expansion and contraction using the expansion/contraction amount table.

7. An inkjet printing method comprising:

transporting a recording medium in a prescribed transport direction;

outputting from an encoder a pulse signal based on an amount of shift of the recording medium caused by the transporter;

generating a first ejection timing signal indicating first ejection timing when a first head ejects ink to a target portion of the recording medium being transported based on the pulse signal, and outputting the first ejection timing signal to the first head;

calculating printing-ratio information based on print data for forming characters or images on the recording medium;

estimating an amount of expansion and contraction occurring in the target portion in the transport direction based on the printing-ratio information;

generating correction information including the amount of expansion and contraction based on the amount of expansion and contraction and the first ejection timing signal; and generating a second ejection timing signal indicating second ejection timing when a second head ejects ink toward the target portion;

wherein the second head is positioned most downstream in the transport direction and located away from the first head by a head-to-head distance on a downstream side in the transport direction, and wherein generating the second ejection timing signal includes:

acquiring the pulse signal and the correction information;

determining whether a moving distance of the recording medium from the ejection timing of the first head for the target portion has exceeded a corrected distance that is obtained by correcting the head-to-head distance using the amount of expansion and contraction, based on the pulse signal and the amount of expansion and contraction included in the correction information; and when determining that the moving distance has exceeded the corrected distance, generating a second ejection timing signal by adjusting the pulse signal by a time quantity corresponding to the amount of expansion and contraction in the target portion, and outputting the second ejection timing signal to the second head.

* * * * *